Sept. 24, 1963  W. K. CAPEWELL ET AL  3,105,207
ADJUSTABLE COUPLER BETWEEN PARTIALLY INTERSECTING
COAXIAL LINES HAVING COUPLING VARIED
BY CENTER CONDUCTOR MOVEMENT
Filed Jan. 2, 1962  2 Sheets-Sheet 1
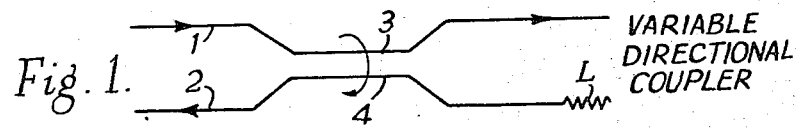
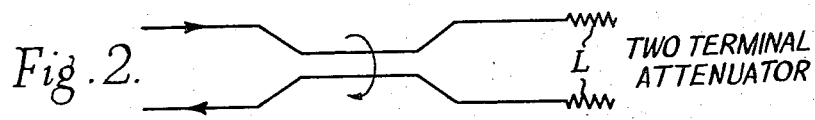
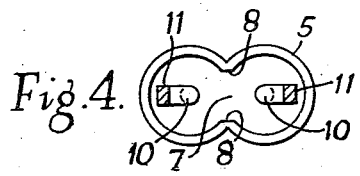
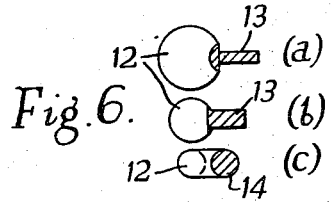
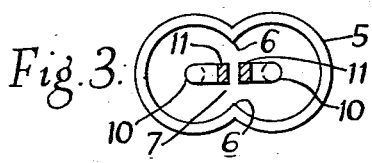
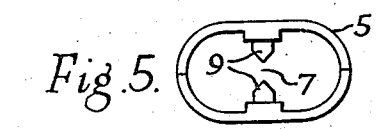
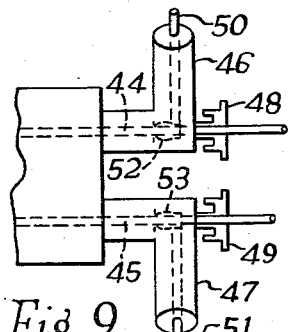
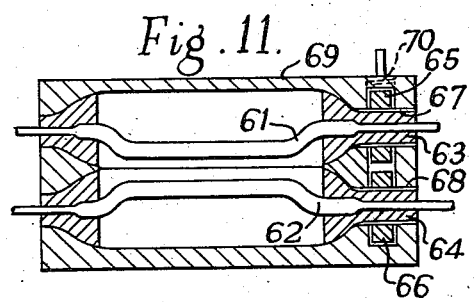
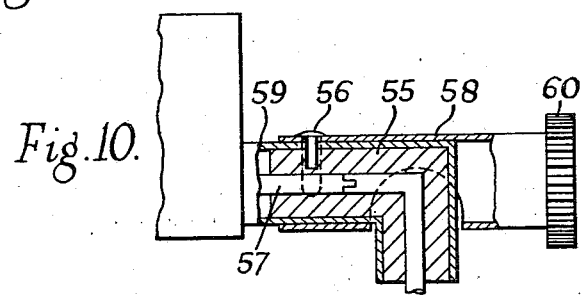
INVENTORS
William K. Capewell
and Anthony R. Price
BY Wendroth,
Lind & Ponack ATTORNEYS

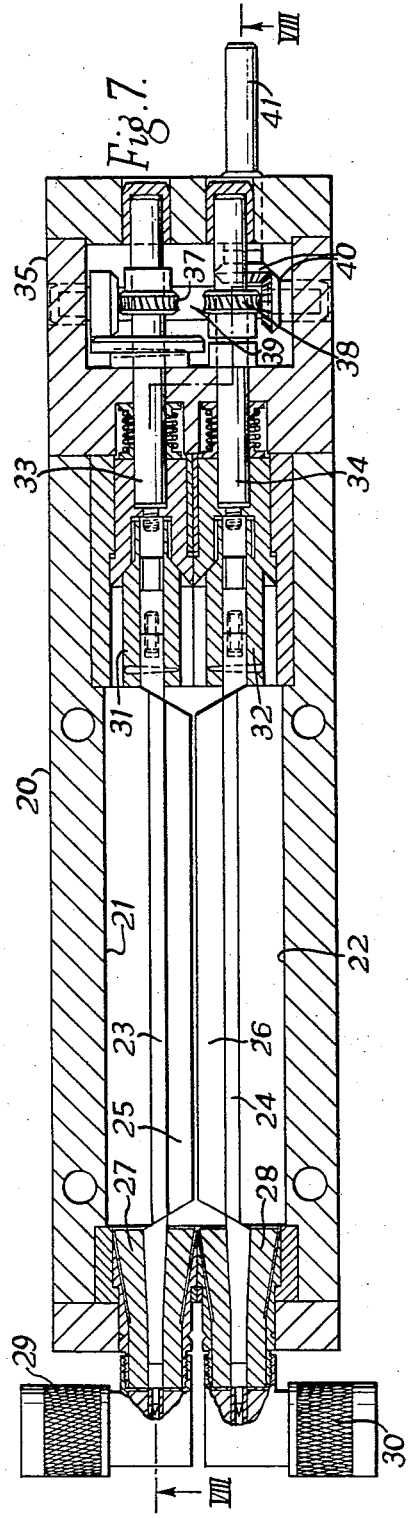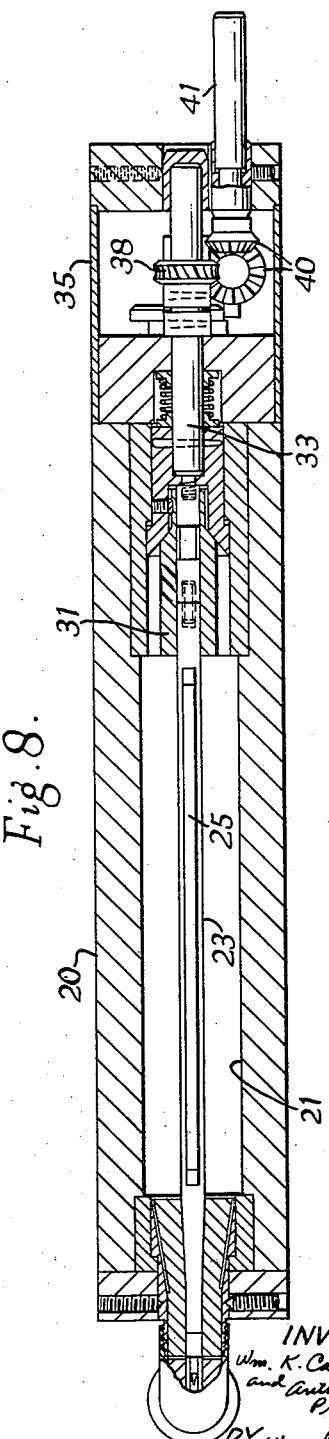

United States Patent Office 3,105,207
Patented Sept. 24, 1963

3,105,207
ADJUSTABLE COUPLER BETWEEN PARTIALLY INTERSECTING COAXIAL LINES HAVING COUPLING VARIED BY CENTER CONDUCTOR MOVEMENT
William Kenneth Capewell, Rochester, and Anthony Rhys Price, Maidstone, England, assignors to Elliott Brothers (London) Limited, London, England
Filed Jan. 2, 1962, Ser. No. 163,524
Claims priority, application Great Britain Jan. 4, 1961
7 Claims. (Cl. 333—10)

This invention relates to coaxial transmission lines and more particularly to a device for providing a controllable coupling between two transmission lines.

One object of the present invention is to provide an improved device by which the coupling between two transmission lines may be varied.

Another object of the invention is to provide an improved device by which the amount of power transferred from one transmission line to another may be controlled, the device acting as a variable directional coupler.

A further object of the invention is to provide an improved device which is capable of controlling the transfer of power between two transmission lines, the device acting as a variable attenuator.

Other objects and advantages of the invention will become apparent during the course of the following description with reference to the drawings, in which:

FIGURES 1 and 2 are explanatory diagrams;

FIGURES 3, 4 and 5 show diagrammatic cross sections of alternative shapes of the outer conductors of two transmission lines within the device, FIGURES 3 and 4 also showing minimum and maximum coupling respectively between the inner conductors of the transmission lines;

FIGURE 6 shows in diagrammatic form alternative shapes of inner conductor;

FIGURE 7 is a central longitudinal section of one form of the improved device of this invention;

FIGURE 8 is a section on the line VIII—VIII of FIGURE 7, and

FIGURES 9, 10 and 11 show in diagrammatic form certain modifications of the device of FIGURES 7 and 8.

The improved device of this invention comprises two sections of coaxial line arranged adjacent to each other and with the outer conductors thereof having a common wall. An elongated slot is formed in this common wall extending in the direction of the axis of the conductors and means is provided for varying the relative spacing of those portions of the inner conductors which extend opposite the slot, whereby the coupling between the inner conductors may be varied.

Variation of the spacing of the inner conductors may be effected in many different ways. For example, at least one of the conductors may be provided over the appropriate part of its length with a laterally extending rib or it may be cranked or offset so that the appropriate part of its length is laterally displaced relative to its principal axis. In such arrangements the relative spacing of the two inner conductors may be varied by rotation about its longitudinal axis of that conductor which is formed with the rib or offset portion. Preferably each conductor is so formed and means is provided for rotating both conductors simultaneously in the same or in opposite directions whereby to vary the effective spacing between them.

The actual shape of the laterally extending or offset portions of the inner conductors and the shape of the slot between them may be varied in many ways and according to the variation of coupling desired as each of the inner conductors is rotated. The length of the slot is, however, preferably an odd number of ¼ wavelengths at the design center frequency of the operating wave range.

Referring firstly to FIGURES 1 and 2, FIGURE 1 shows in diagrammatic form the device of this invention arranged as a variable directional coupler. The inner conductors 1 and 2 of parallel transmission lines are, as indicated, each formed with an offset or cranked portion 3 and 4, or equivalently with a laterally extending rib, which portions are rotatable about the respective axes of conductors 1 and 2 so that they can approach or recede from one another. By this means the amount of power transferred from the conductor 1 of the first line to the conductor 2 of the second line may be controlled over an appreciable range, the unused terminal of the second line being provided with an appropriate termination L as indicated.

FIGURE 2 shows the device arranged as a variable attenuator and in this case the unused terminal of each line is provided with a suitable termination L as indicated.

Conveniently the casing of the device constitutes the outer conductors and for this purpose it may be formed with two parallel bores of equal diameter which are spaced apart by less than one diameter. One such arrangement is shown diagrammatically in FIGURE 3 where the regions of the casing 5 where the bores intersect is left with a sharp edge 6 which defines the desired slot 7. Alternatively, as shown diagrammatically in FIGURE 4, these regions of the casing 5 may be formed with a flat 8. In a further form shown in FIGURE 5, the casing 5 may be formed to present a bore which in section has flat sides and semi-circular ends, the slot 7 between the two portions being defined by portions 9 which project towards one another from the center of the opposite flat sides.

FIGURES 3 and 4 also illustrate the provision of central conductors 10 each provided with cranked portions 11 of square section which extend parallel with an offset from the central axis of the conductors, the cranked portions being shown in their position of minimum spacing in FIGURE 3 and maximum spacing in FIGURE 4.

As mentioned above, the desired variation in effective spacing of the conductors may be produced by shaping the conductors in various ways. FIGURES 6a, b and c show examples of alternative arrangements, FIGURE 6a showing an end view of a conductor 12 having a laterally extending rib 13 provided thereon, FIGURE 6b showing a conductor 12 which is formed with an offset rib-like portion 13, the body of the conductor adjacent to and to the left of the rib-like portion being cut away to provide maximum spacing between adjacent edges of the conductors when they are turned to their position of minimum coupling, while FIGURE 6c shows a conductor 12 having a laterally offset or cranked portion 14 of circular section.

Referring now to FIGURES 7 and 8, in which is shown a device in accordance with the invention arranged as a variable attenuator, the device comprises an elongated rectangular casing 20 which constitutes the outer conductors of two parallel sections of transmission line and which is formed with two parallel bores 21 and 22 of equal diameter, the centres of which are spaced apart by less than one diameter to provide an internal cross section similar to that shown in FIGURE 3 or 4. Through each bore and concentric therewith extends a shaft 23, 24 which is cut away at one side and on the other side of which is provided a laterally extending rib 25, 26. At the left-hand ends, the shafts extend through respective bushes 27, 28 formed of dielectric material and are rotatably connected with terminals 29, 30 of conventional design. At their right-hand ends the shafts 23, 24 pass through bushes 31, 32 of dielectric material and are connected with extension portions 33, 34 which extend into an end housing 35 and are journalled in bearings therein. Each extension portion 33, 34 has fast thereon a worm wheel 37, 38 which engages a common worm 39 mounted for rotation in housing 35. Rotation of the worm 39 is effected through bevel gears 40 by the rotation of a spindle 41. The rotation of this spindle may be effected by any suitable means which may include an indicating device of any known or suitable kind which may be calibrated to show the angular rotation of shafts 23, 24 or if desired the attenuation produced by such rotation. It will be noted that this arrangement operates to rotate both shafts in the same direction but if desired it may be modified so as to rotate the shafts in opposite directions whereby to provide a different law relating angular movement of the shafts to change in coupling.

The device described above with reference to FIGURES 7 and 8 is an attenuator and since it includes suitable built-in terminations for the righthand ends of the inner conductors, it is practicable to drive these conductors in the manner shown. Where, however, the device is to be used as a directional coupler, different driving arrangements may be required.

One possible arrangement is illustrated diagrammatically in FIGURE 9. In this case rotation of the relevant portions of the inner conductor or conductors 44, 45 is effected as shown by providing 90° elbows 46, 47 at one end of the device, the inner conductors extending out through the elbows and a suitable choke 48, 49 to driving means, not shown. The continuations 50, 51 of the inner conductors within the elbows are electrically connected with conductors 44, 45 by means of spring clips 52, 53 which permit rotation of these conductors. In an alternative arrangement shown in FIGURE 10, the elbows, of which only one is shown, are filled with a suitable dielectric 55 and a pin 56 of the same material is provided which mechanically links the rotatable portion 57 of the inner conductor with a sleeve 58 which surrounds an extension 59 of the outer conductor, the pin extending through a slot therein. The sleeve 58 itself is slotted to pass the elbow and permit rotation through about 180° and may be provided at its outer end as shown with a knob 60 for direct manual control or with a gear wheel which is engaged by suitable driving means, not shown.

A further alternative form of a driving means is shown diagrammatically in FIGURE 11. In this arrangement the rotatable portions of the inner conductors 61, 62 are driven by means of splined dielectric sleeves 63, 64, the outside surfaces of which are keyed into the internal bores of worm wheels 65, 66, the splined inside diameters of the worm wheels being such that they form a continuation of the internal bores of the coaxial outer conductors constituted at this point by the bores 67, 68 of reduced diameter formed in housing 69. The dielectric sleeves 63, 64 are pinned to the rotatable portions of the inner conductors 61, 62 which may accordingly be rotated by rotation of a worm 70 which engages both the worm wheels 65, 66.

In all forms of the invention described herein the driving means by which the inner conductor or conductors are rotated may include a suitable dial or like device for indicating the extent of rotation of the conductor or conductors and such indicating means may be calibrated in terms of coupling or attenuation as required.

We claim:
1. A device for providing a controllable coupling between two adjacent transmission lines comprising a transmission line section including two outer conductors, an inner conductor within each outer conductor, a slot formed in that part of the wall of each said outer conductor intermediate said inner conductors and elongated in the direction of the axes of said conductors, at least one of said inner conductors being formed over that part of its length adjacent said slot with a portion which projects to one side of the central longitudinal axis of said conductor, and means for rotating said part of said conductor.

2. A device for providing a controllable coupling between two adjacent transmission lines comprising a housing having parallel bores formed therein, and a slot in the common wall separating said bores extending in the direction of the axis of said bores, an inner conductor extending concentrically through each bore, each said conductor having a portion adjacent said slot extending laterally from the central longitudinal axis of said conductor, and means for rotating both said conductors.

3. A device for providing a controllable coupling between two adjacent transmission lines comprising a housing having parallel overlapping bores extending therethrough, the walls of said bores constituting the outer conductors of two transmission line sections, an inner conductor concentric with each said bore and extending therethrough, each said inner conductor having a portion extending laterally from the central longitudinal axis thereof, and means for simultaneously rotating each said inner conductor.

4. A device according to claim 3, each said inner conductor having formed thereon a laterally projecting rib which extends along the length of the said conductor.

5. A device according to claim 3, each said inner conductor being formed with an offset portion which extends parallel to the central longitudinal axis of the said conductor.

6. A device for controlling the coupling between two transmission lines comprising a housing formed with two parallel equal diameter bores extending therethrough, the centres of said bores being spaced by less than the diameter of said bores, a conductor extending through each bore and arranged concentric therewith, means for supporting each conductor for rotation about its central longitudinal axis, said means including a sleeve of dielectric material surrounding each end of said conductor and located in the ends of said bores, each said conductor within said bore being formed with a longitudinally extending projection which projects from the central axis of said conductor and means for rotating each said conductor.

7. A device according to claim 6 and including a worm wheel fast with one end of each of said conductors and a common worm engaging both said worm wheels.

References Cited in the file of this patent

UNITED STATES PATENTS 2,792,550  Backstrand _____ May 14, 1957
2,951,218  Arditi _____ Aug. 30, 1960

OTHER REFERENCES

Handbook of TRI-PLATE Microwave Components, Sanders Associates, Nashua, New Hampshire, 1956, pages 4, 5 relied on.